United States Patent [19]

Calzavara

[11] Patent Number: 5,291,919
[45] Date of Patent: Mar. 8, 1994

[54] HIGH-PRESSURE VALVE DEVICE PARTICULARLY FOR PRESSURIZED FLUIDS

[75] Inventor: Luciano Calzavara, Baveno, Italy

[73] Assignee: Secondo Mona S.p.A., Somma Lombardo, Italy

[21] Appl. No.: 979,692

[22] Filed: Nov. 20, 1992

[30] Foreign Application Priority Data

Nov. 27, 1991 [IT] Italy ............... MI91 A 003163

[51] Int. Cl.$^5$ ............... F16K 37/00; F16K 31/05; F16K 31/50
[52] U.S. Cl. ............... 137/554; 251/129.03; 251/129.04; 251/129.12; 251/268; 251/269; 251/274; 74/424.8 VA
[58] Field of Search ............... 137/554; 251/129.03, 251/129.04, 129.11, 129.12, 267, 268, 269, 274; 74/424.8 VA

[56] References Cited

U.S. PATENT DOCUMENTS

| | | | |
|---|---|---|---|
| 1,974,335 | 9/1934 | Kimball | 251/129.12 |
| 2,753,030 | 7/1956 | Wight | 251/129.12 X |
| 2,878,687 | 3/1959 | Kron et al. | 74/424.8 VA X |
| 3,115,786 | 12/1963 | Bredtschneider et al. | 74/432 |
| 3,137,475 | 6/1964 | Schoenecker | 251/268 X |
| 3,371,545 | 3/1968 | McNeal et al. | 74/89.15 |
| 3,449,982 | 6/1969 | Mutchinson et al. | 251/129.12 X |
| 3,994,179 | 11/1976 | Morrell | 74/424.8 VA X |
| 4,770,203 | 9/1988 | Laurel | 251/268 X |
| 4,770,390 | 9/1988 | Tratz et al. | 14/424.8 VA X |
| 4,915,349 | 4/1990 | Inoue et al. | 251/129.11 X |

FOREIGN PATENT DOCUMENTS

| | | |
|---|---|---|
| 6605302 | 5/1970 | Fed. Rep. of Germany . |
| 1675483 | 4/1971 | Fed. Rep. of Germany . |
| 7521193 | 10/1975 | Fed. Rep. of Germany . |
| 2442622 | 3/1976 | Fed. Rep. of Germany . |
| 2549556 | 12/1976 | Fed. Rep. of Germany . |
| 1328978 | 4/1962 | France . |
| 1094507 | 10/1965 | United Kingdom . |

Primary Examiner—John Rivell
Attorney, Agent, or Firm—Guido Modiano; Albert Josif; Daniel O'Byrne

[57] ABSTRACT

The high-pressure valve has a valve body defining an elongated longitudinal extension, delimiting a chamber and having an input port, which is defined on its lateral surface, and an output port, which is arranged on a first axial end thereof. The valve body supports, on a second end, a motor and a manual actuation member which can be connected, by virtue of coupling members, to a shaft for the actuation of a first bush accommodated within the chamber. The first bush is provided with actuation elements for the sealed non-rotational movement of adjustment pin which opens a connecting path between the input port and the output port. The adjustment pin engages in a neck located in the chamber and moves toward the output port, in order to open the connecting path, and in the opposite direction, in order to close it. Sensors are furthermore provided for detecting movement of the adjustment pin.

15 Claims, 2 Drawing Sheets

HIGH-PRESSURE VALVE DEVICE PARTICULARLY FOR PRESSURIZED FLUIDS

BACKGROUND OF THE INVENTION

The present invention relates to a high-pressure valve device particularly for pressurized fluids.

In the field of high-pressure high-precision valves for pressurized fluids there are currently various kinds of valves with special characteristics in terms of the type of fluid and the exceptionally fine adjustments required.

Said valves have some shortcomings which, in particularly extreme situations of use, i.e. with fluids having a very high feed pressure and in the presence of very high pressure differences between the input and the output of the valve with a large passage section, create some problems which severely limit their use.

Currently available valves in fact are inadequate from the point of view of adjustment sensitivity, since for example in some solutions the coupling between the actuation screw of the adjustment handwheel and the slider for the opening of the valve is often constituted by a simple split washer. This fact considerably compromises the ability to finely adjust the opening of the valve, especially in the presence of high pressure differences, since a play of a few hundredths of a millimeter can make adjustment insensitive and difficult.

Furthermore, the slider does not move only along the axis of the valve itself, but often, proximate to the closure point, the force applied to the handwheel rotates the slider itself against its seat in the valve body, causing, after a period of use which is normally not very long, leaks inside the valve itself.

Any laminar leakage inside the valve requires specific provisions for its drainage, since there is the risk of losing the hydraulic balance of the valve, if any, thus compromising its functionality.

Other solutions provide for the direct actuation of a slider or shutter having various shapes, provided by means of membrane pneumatic actuators or hydraulic or electric servo controls.

Actuation with pneumatic actuators entails the disadvantage of the considerable surface required by the actuator itself, with consequent considerable increase in the size of the valve. The intrinsic poor adjustment sensitivity can at the most be reduced by adding a positioner which is rigidly coupled to the slider.

Actuation by using hydraulic or electric power to control a slider or shutter using linear hydraulic actuators or electric servomotors coupled by means of gearboxes for the necessary speed reduction of the motor, has an adjustment sensitivity which is extremely difficult to improve, even when high pressure differences are not present.

SUMMARY OF THE INVENTION

The aim of the present invention is to eliminate or substantially reduce the problems described above in known types of valve by providing a high-pressure valve device particularly for pressurized fluids which withstands high pressure differences with a wide passage section.

Within the scope of the above aim, an object of the present invention is to provide a valve device which can be adjusted in a very sensitive manner both locally and with remote controls.

Not least object of the present invention is to provide a valve device which is highly reliable, relatively easy to manufacture at competitive costs and has modest maintenance costs.

This aim, these objects and others which will become apparent hereinafter are achieved by a high-pressure valve device particularly for pressurized fluids, comprising a valve body which has an elongated longitudinal extension, delimits a chamber and has an input port, which is defined on the lateral surface of said body, and an output port, which is arranged on a first end thereof along the axis of said valve body, according to the invention, characterized in that said valve body supports, on a second end, external actuation means which can be connected, by virtue of coupling means, to a shaft for the actuation of a first bush which is accommodated within said chamber, said first bush having actuation means for the sealed non-rotational movement of adjustment means for opening a connecting path between said input port and said output port, said adjustment means engaging in a neck located in said chamber and being movable toward said output port, in order to open said connecting path, and movable in an opposite direction, in order to close said connecting path, means being provided for detecting movement of said adjustment means.

BRIEF DESCRIPTION OF THE DRAWINGS

Further characteristics and advantages of the invention will become apparent from the description of two preferred but not exclusive embodiments of a high-pressure valve device particularly for pressurized fluids according to the invention, illustrated only by way of non-limitative example in the accompanying drawings, wherein.

DESCRIPTION OF THE PREFERRED EMBODIMENTS

Figure 1:
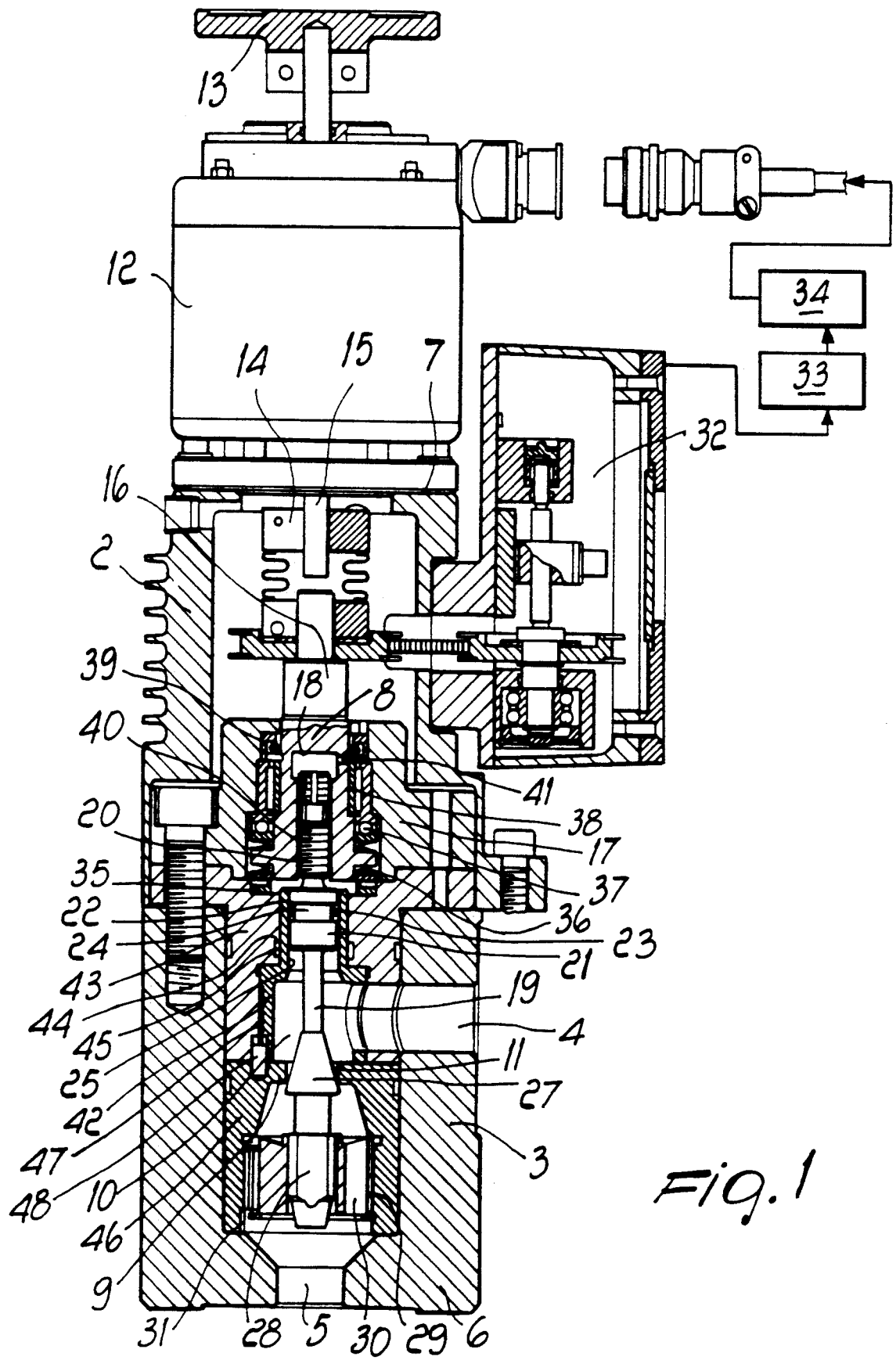
FIG. 1 is a partially sectional front elevation view of a first embodiment of a valve device according to the invention.

With reference to FIG. 1, a high-pressure valve device particularly for pressurized fluids comprises a valve body, generally designated by the reference numeral 1, which has an elongated longitudinal extension and is composed of an upper body 2 and of a lower body 3 which delimit a chamber 10.

The body 3 has an input port 4, defined on its lateral surface, and an output port 5, arranged on a first end 6 of the body 1 coaxially to the lower body 3.

The valve body 1 supports, on a second end 7, i.e. on the upper body 2, external actuation means, constituted for example by motorization means and by manual actuation means which can be connected, by virtue of coupling means, to an actuation shaft 16 of a first bush 8 accommodated within the body 2.

Said first bush 8 has actuation means for the non-rotational sealed movement of adjustment means which open a connecting path 11 between the input port 4 and the output port 5. The adjustment means engage in a neck or neck-like portion 9 located in the chamber 10 and can move toward the output port 5, in order to open the connecting path 11, and in the opposite direction, in order to close it.

Means are furthermore provided for detecting the movements of the adjustment means.

The motorization means comprise a step motor or synchronous motor 12 which motorizes the adjustment means.

The manual actuation means comprise a handwheel 13 which actuates the rotation of the adjustment means.

The coupling means comprise a bellows joint 14 penetrated by a motor shaft 15, which protrudes from the motor 12, and by an actuation shaft 16.

The first bush 8 is accommodated within an accommodation seat defined within a second bush 17, with respect to which the first bush 8 rotates.

The means for actuating the first bush 8 comprise a hollow blind hole 18 which is at least partially internally threaded and in which the adjustment means engage by penetrating it. The thread 40 is advantageously constituted by a threaded insert which can be easily replaced when it wears out.

The adjustment means comprise a pin 19 having a first end 20 which penetrates the hole 18 of the first bush and is at least partially threaded on its surface. The thread of the first end 20 is interrupted by a groove which communicates with the upper end by means of two opposite longitudinal notches.

Said pin 19 has, proximate to its first end 20, a slider 21 which is sealingly movable, so as to maintain a seal, ensured by means of two extrusion-preventing rings 22 and a sealing ring 23 which are inserted in a groove 24 of the slider 21, within a hole 25 defined in a third hollow bush 42. The third bush 42 is provided with a continuation of the input port 4 and with a continuation of the output port 5.

The third bush 42 is inserted with a certain degree of play in the fourth bush 43. The seal between the third bush 42 and the fourth bush 43 is ensured by means of two extrusion-preventing rings 44 and by a sealing ring 45. The purpose of the third bush 42 is to allow the best possible alignment, when the valve is closed, between the point or connecting path 11 and the thread of the connection and adjustment means which engages the insert 40.

In this manner it is furthermore possible to produce the fourth bush 43 using low-cost materials and limit the use of special materials and finishes exclusively to the third bush 42. Said third bush can furthermore be advantageously replaced in case of wear of the sliding surfaces. The third bush 42 has a certain vertical play so as to avoid hindering the packing of the fourth bush 43 on a fifth bush 46. An annular chamber 47 defined on the third bush 42 allows the radial balancing of said bush with respect to input pressure, whereas a dowel 48 locks the input port of the third bush 42 in alignment with the corresponding input port of the fourth bush 43 and accordingly with the output port 5.

The pin 19 enters the chamber 10 which connects the input port 4 and the output port 5. Said chamber 10 is delimited, toward the output port 5, by the neck 9 in which a frustum-shaped expansion 27 of the pin 19 engages.

The pin 19 has a second polygonal end 28 located toward the output port 5. The end 28 is accommodated within a sixth bush 29 which is provided with channels 30 for connecting the chamber 10 and the output port 5, the connecting channels 30 providing for pressure recovery after the frustum-shaped expansion 27 for reducing cavitation and noise of the fluid. The sixth bush 29 is provided with means for engaging within a groove 31 defined on internal walls of the bush 46 to prevent the rotation of said bush and therefore of the pin 19.

Rotation is furthermore prevented by the engagement of the dowel 48, which rigidly couples the position of the bush 46 respectively to the fourth bush 43 and to the third bush 42.

The detection means comprise sensors 32 which detect the movements of the pin 19 and send, by means of a transmission interface 33, the detected data to a remote control 34 which actuates the motor 12.

In the open-loop adjustment condition, said sensors 32 can be used merely for the remote indication of the real position of the pin 19.

An axial roller bearing 35 and a series of cup-shaped springs 36, installed on the two opposite shoulders of the bush 8, are interposed between the first bush 8 and the fourth bush 43. Ball bearings 37 and roller bearings 38 are interposed between the second bush 17 and the first bush 8. A sealing ring 39 allows long-lasting lubrication of the moving parts, since the chambers of the bearings 35, 37 and 38, the threaded end 20 and the hole 18 are filled with grease.

After having saturated the blind hole 18 with lubricating grease, this operation being facilitated by the presence of the venting hole 41, lubrication of the internal movement elements is provided automatically by the groove, which being saturated with lubricant carries said lubricant along the thread during its movement.

The axial roller bearing 35 and the bearings 37 and 38 allow the rotation of the first bush 8 with respect to the second and fourth bushes 17 and 43, whereas the cup-shaped springs 36 bear the thrusts transmitted to the first bush 8 by the actuation shaft 16.

The function of the cup-shaped springs 36 is mainly to progressively absorb the impact torques generated by the motor when the opening and closure mechanical stroke limits of the pin 19 are reached respectively. The bellows joint 14 absorbs the consequent axial movements.

The lower cup-shaped springs 36, in addition to the above described function, cooperate with the sealed closure provided by the frustum-shaped expansion 27, since when play due to wear forms in use between the neck 9 and the expansion 27, the cup-shaped springs 36 raise the first bush 8 so as to always maintain the tightness of said closure.

Furthermore, advantageously, any leakage of fluid through gaps produced by operation and/or wear are in any case conveyed toward the output port 5, as more clearly illustrated by FIG. 1.

Figure 2:
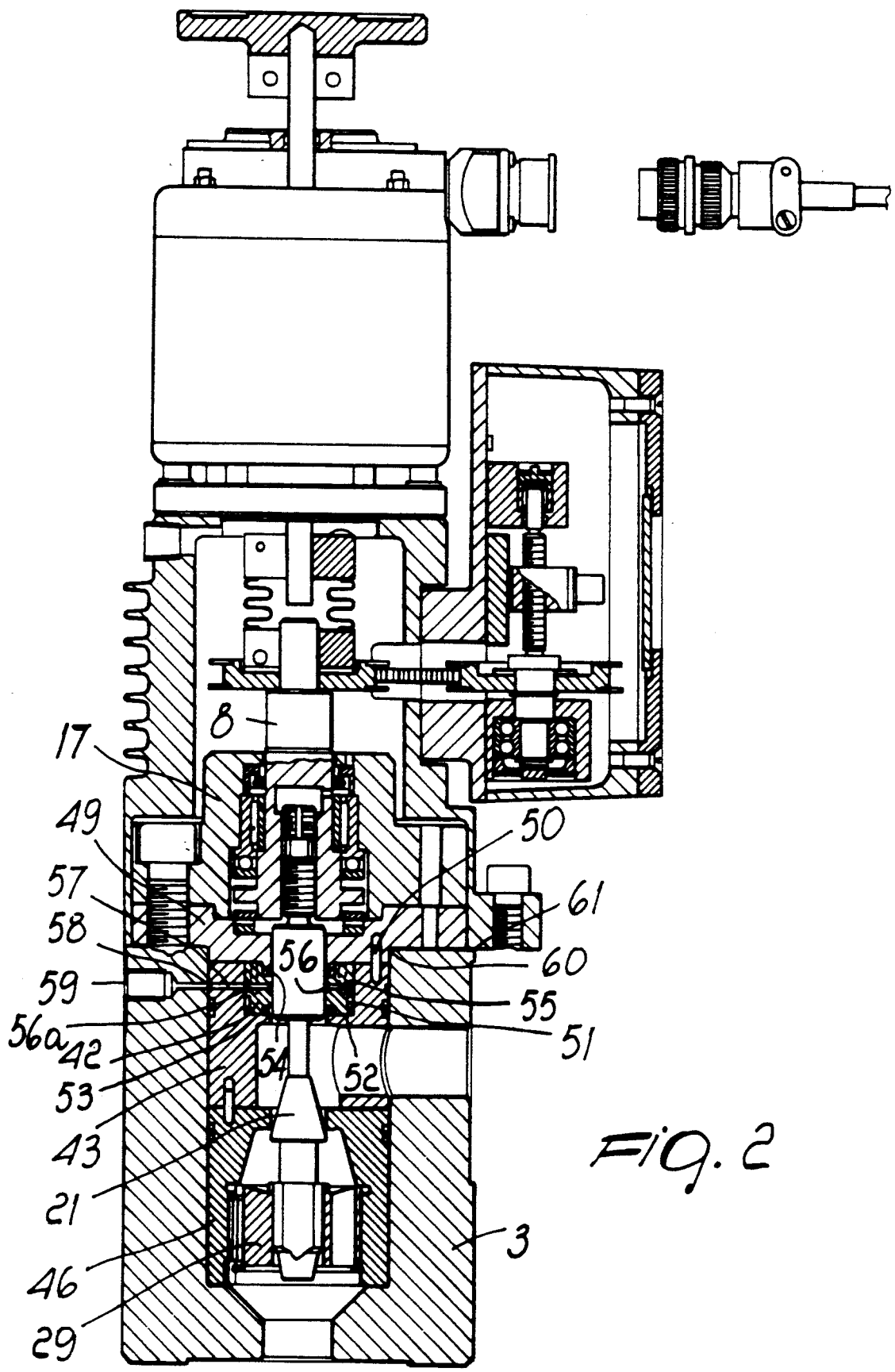
FIG. 2 is a partially sectional front elevation view of a second embodiment of a valve device according to the invention.

With reference to FIG. 2, in a second embodiment of the present invention, the third bush 49 keeps in position a fourth bush 42 which is accommodated inside a fifth bush 43.

This characteristic allows to use the invention with fluids which are aggressive and/or scarcely or not at all lubricating, and furthermore allows programmed maintenance intervention when leaks occur at the port 59; said leaks can be routed safely and at will.

The appearance of leaks at the port 59 is in fact an indication of a loss of efficiency in the first series of seals 53 inserted between the fourth bush 42 and the fifth bush 43. Accordingly, the invention can still be used temporarily by virtue of the presence of the second series of seals inserted between the fourth bush 42 and the third bush 49.

Any fluid which may leak past the first series of seals 53 and 54 is collected in a first annular chamber 56 and then sent, by means of a series of radial holes 55, to a second annular chamber 56a which is external to the first chamber 56 and is in contact with the fifth bush 43. A radial hole 57 defined in the fifth bush 43 collects the drained fluid in a subsequent annular chamber 58, from which it is conveyed outside the valve according to the invention by means of the threaded connection 59 which allows conveyance of the drained fluid via a pipe into an external safety container.

The fourth bush 42 floats in the seat defined by the opposite third bush 49 and fifth bush 43, thus allowing optimum alignment of the slider 21.

In order to prevent leaks of pressurized fluid, a gasket 51 and an extrusion-preventing ring 52 are inserted between the fourth bush 42 and the fifth bush 43. Equally, in order to prevent drained fluid leaks from escaping through the interstice 61 defined between the third bush 49 and the body 3, a gasket 60 is inserted therebetween.

Practical tests have shown that the embodiments of the present invention described herein achieve the intended aim and objects, constituting a high-pressure valve device which is capable of meeting the most stringent demands of the market as regards both safety and functionality, and is furthermore capable of being advantageously repaired.

The invention thus conceived is susceptible to numerous modifications and variations, all of which are within the scope of the inventive concept. All the details may furthermore be replaced with other technically equivalent elements.

In practice, the materials employed, as well as the dimensions, may be any according to the requirements.

I claim:

1. High-pressure valve device particularly for pressurized fluids, comprising a valve body which has an elongated longitudinal extension, delimits a chamber and has an input port, which is defined on the lateral surface of said body, and an output port, which is arranged on a first end thereof along the axis of said valve body, wherein said valve body supports, on a second end, external actuation means which can be connected, by virtue of coupling means, to a shaft for the actuation of a first bush which is accommodated within said chamber, said first bush having actuation means for the sealed non-rotational movement of adjustment means for opening a connecting path between said input port and said output port, said adjustment means engaging in a neck located in said chamber and being movable toward said output port, in order to open said connecting path, and movable in an opposite direction, in order to close said connecting path, means being furthermore provided for detecting movement of said adjustment means, said adjustment means comprising a pin a first end of which is at least partially threaded on its surface, is provided with a lubricant entrainment system and penetrates a blind hole of said first bush, said pin having, proximate to said first end, a slider which is movable and sealed by extrusion-preventing rings and sealing rings, within a hole defined in a third hollow bush, said third bush being inserted in a fourth bush, said third bush and said fourth bush being mutually coaxial and being provided with a connection to said input port and to said output port, and entering a chamber for connection between said input port and said output port, said connecting chamber being delimited, toward said output port, by a neck provided on a fifth bush locked in alignment with respect to the fourth and third bushes and in which a frustum-shaped expansion of said pin engages, said pin being provided, on a second end which is arranged toward said output port, with a sixth bush which is provided with channels for connecting said chamber and said output port, means being further provided for engaging within grooves defined on walls of said sixth bush, said means being suitable to prevent the rotation of said pin.

2. Valve device according to claim 1, wherein said external actuation means which can be installed both together and separately.

3. Valve device according to claim 2, wherein said motorization means comprise a step or synchronous motor which is suitable to motorize said adjustment means.

4. Valve device according to claim 2, wherein said manual actuation means comprise a handwheel which is suitable to actuate said adjustment means.

5. Valve device according to claim 2, wherein said coupling means comprise a bellows joint which is entered by a motor shaft, which protrudes from a step or synchronous motor, and by said actuation shaft.

6. Valve device according to claim 2, wherein said first bush is accommodated within an accommodation seat defined within a second bush with respect to which said first bush rotates, said first bush being provided with said actuation means in which said adjustment means enter.

7. Valve device according to claim 2, wherein said actuation means of said first bush comprise a blind hole which is at least partially internally threaded by means of a replaceable insert and in which said adjustment means engage.

8. Valve device according to claim 2, wherein said sixth bush is provided with connecting channels for producing a recovery of pressure after said frustum-shaped expansion for reducing cavitation and noise of the fluid, said channels conveying fluid back towards the output port via the profile of the end of the adjustment pin and the converging profile of the output port.

9. Valve device according to claim 2, wherein said detection means further comprise sensors which are suitable to detect the movements of said pin and to send, by means of a transmission interface, the detected data to a remote control which is suitable to actuate said actuation means or to remotely indicate the actual position of said pin.

10. Valve device according to claim 2, further comprising an axial roller bearing and cup-shaped springs which are interposed between said bush and said fourth bush, and cup-shaped springs which are interposed between said first bush, said bearings and said second bush.

11. High-pressure valve device particularly for pressurized fluids, comprising:
 a valve body which defines a chamber (10) and which has an input port (4) and an output port (5) for fluid flow, a connecting path (11) being defined between said input port and said output port at which a valve neck portion (9) is arranged;
 a pin element (19) movably disposed inside said chamber and being provided with a valve expansion (27) for engaging in said valve neck portion for controlling the flow through said connecting path; and
 displacing means (8,12–16,20,40) for linearly displacing said pin element inside said chamber;
 said pin element comprising a slider portion (21) which is sealingly slidable inside a bush element (42) of said valve body, said bush element being supported by said valve body so as to be able to move slightly with small plays in a direction of linear displacement of said pin element.

12. Valve device according to claim 11, wherein said displacing means comprise a motorized internally threaded hollow bush element (8) which is rotatably supported by said valve body, and a threaded end (20) of said pin element which is screwed inside said hollow bush element, the valve device further comprising spring-biasing means (36) interposed between said valve body and said hollow bush element which is thereby movably supported by the valve body in said direction of linear displacement of said pin element.

13. Valve device according to claim 12, wherein said displacing means further comprise a step or synchronous motor (12) with a motor shaft (15) connected to an actuation shaft (16) of said hollow bush element with a coupling bellows joint (14) interposed therebetween.

14. Valve device according to claim 11, further comprising detecting means (32) for detecting movement of said pin element, and control means (34), connected to said detecting means, for actuating said displacing means.

15. Valve device according to claim 11, further comprising means for detecting fluid-leakage between said slider portion of said pin element and said bush element, said means for detecting fluid-leakage comprising: an inner annular chamber (56) of said bush element arranged in contact with said slider portion; radial holes (55) extending through said bush element from said inner annular chamber to an outer annular chamber (56a) of said bush element; and a radial passage (57) extending through said valve body and connecting said outer annular chamber of the bush element with an outlet detection port (59).

* * * * *